Patented Apr. 17, 1951

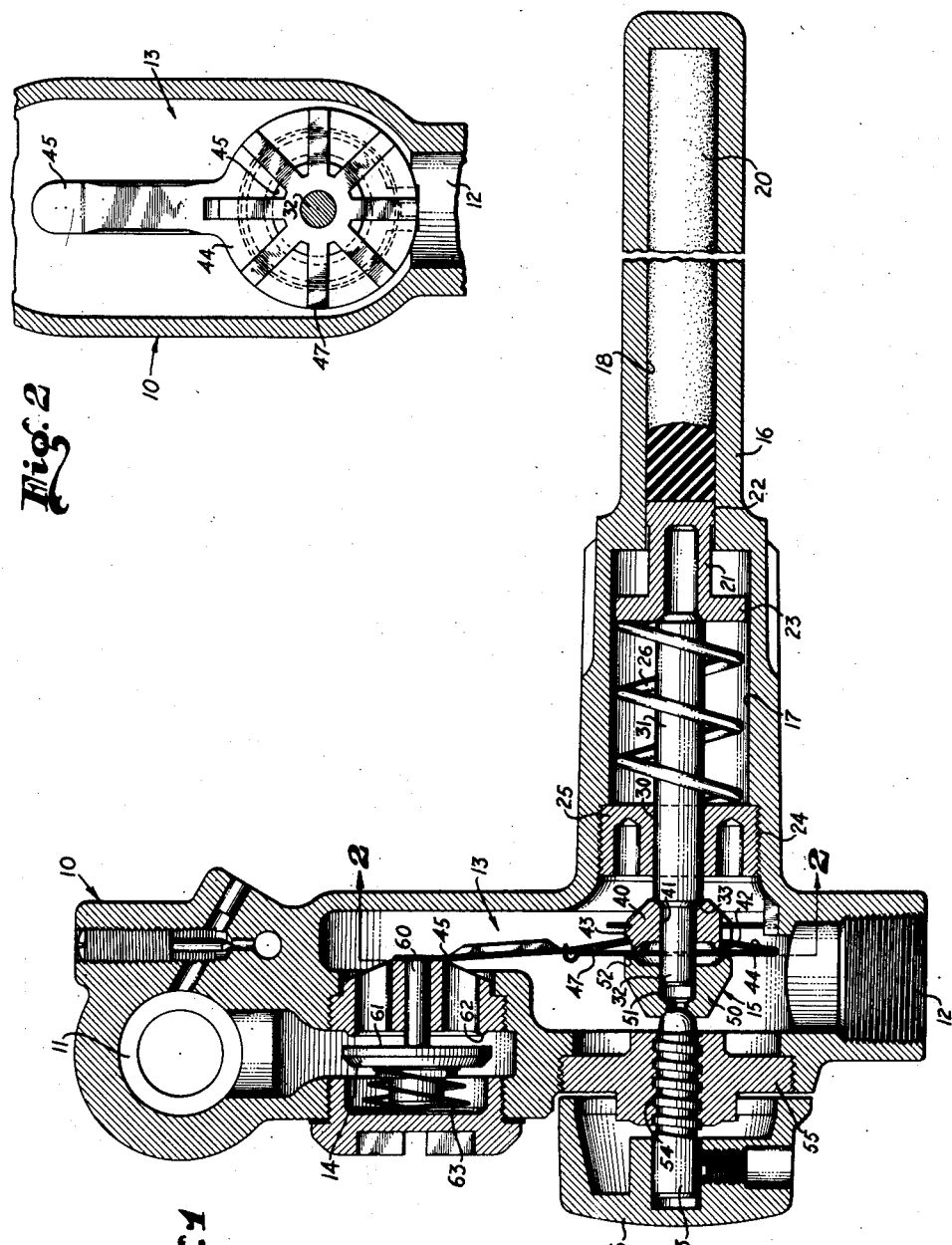

2,548,941

UNITED STATES PATENT OFFICE 2,548,941

ACTUATOR FOR THERMALLY RESPONSIVE CONTROL DEVICES

Dan A. Brown, Long Beach, Calif., assignor, by mesne assignments, to Robertshaw-Fulton Controls Company, Greensburg, Pa.

Application June 23, 1947, Serial No. 756,504

1 Claim. (Cl. 297—6)

My invention relates in its broadest aspect to thermally responsive control devices, and more particularly to a thermally responsive control device wherein a maximum linear movement is obtained by converting volumetric thermal expansion into linear movement.

This invention is particularly adapted to, and will be explained in connection with a thermally responsive control valve used in connection with such items as hot water heaters and the like.

Two types of thermally responsive control devices have been used heretofore. In one of the known types, a substance having a relatively low coefficient of thermal expansion, such as an invar rod, is housed in a metal having a relatively high coefficient of thermal expansion, such as a brass or copper housing. In such a device, the control mechanism, such as a clicker ring, is operated by the relative linear displacement of the invar rod because of the differentials in thermal expansion. One of the primary disadvantages from a practical manufacturing standpoint of such a device lies in the relatively small movement obtainable within the required limits. By that is meant, under normal conditions the rod cannot be of excessive length and the temperature range must be confined within predetermined limits. Such predetermined temperature limits will not permit large relative displacements of the invar rod. Consequently, it has been necessary to exercise the greatest of care in manufacturing the clicker assembly and to hold a very close tolerance.

Some of this objection has been overcome by the use of liquid contained in a housing. The liquid, of course, has a volumetric coefficient of expansion which can readily be translated into a linear movement. It is clear that this will result in a much greater relative displacement for a given temperature differential. However, this solution of the foregoing problem introduces a second and sometimes more difficult manufacturing problem. Great care must be exercised in sealing the containers so that there can be no leak or escape of the contained fluid.

It is an object of this invention to provide a thermally responsive control device which eliminates at the same time both of the above objections. This is accomplished by the use of what may be termed a "quasi" liquid substance having a relatively high degree of thermal expansion which may readily be converted into a linear movement by containing the substance in a relatively rigid housing. In order to accomplish this purpose, I have employed what I will designate as, a rubber or rubber-like substance. It will be understood that the term "rubber" is not to be accepted in its most technical sense, but shall be meant to include not only natural rubber latex but also neoprene, hycar, butyls and other so-called synthetic rubbers and rubber-like plastics.

My invention can best be understood by an explanation in connection with a well known and standard type of gas control valve.

Other and further objects and advantages will become apparent from the drawings and the specifications relative thereto.

In the drawings:

Figure 1 represents a sectional view of a standard type gas control valve adaptable for use in connection with gas fired hot water heaters and containing an embodiment of my invention.

Figure 2 is a sectional view taken on line 2—2 of Figure 1.

I have shown for purpose of illustration only my invention used in connection with a gas control valve. It will be readily apparent that my invention can be used equally as well with electric, steam or other systems requiring thermal control. The valve illustrated comprises a housing, designated generally by the figure 10, usually formed of cast brass, and containing a gas inlet 11, an outlet 12, and a gas valve chamber 13 connecting the inlet 11 with the outlet 12, a valve 14 and a control mechanism designated generally 15. The housing is also formed with a cylindrical portion 16 formed with a bore 17 having a relatively large diameter and a bore 18 having a relatively small diameter. It will be understood that the bores 17 and 18 are usually cylindrical in shape because of the ease of manufacture. It is to be understood however, that the cross-sectional configuration in these particular parts is unimportant and could be square, triangular or any other desired shape. A rubber-like substance 20 having relatively high volumetric coefficient of expansion and being formed with an exterior surface corresponding with the interior surface of the bore 18 is disposed in the bore 18. An actuating piston 21 having a shoulder 22 is disposed in the bore 18 and presses against the rubber-like substance 20, and is also formed with a spring plate 23.

The open end of the bore 17 is counter-bored and threaded at 24 and adapted to receive a plug 25. The rubber-like substance 20 is preloaded by means of a spring 26 which is in tension against the spring plate 23. The plug 25 is formed with an axially disposed bore 30 through which the rod 31 is disposed. One end of the rod 31 is adapted to be in contact with the piston 21 so that any linear movement of the piston 21 causes a similar linear movement of the rod 31. The other end of the rod 31 is formed with a reduced portion 32 defining a shoulder 33 and is adapted to operate the clicker assembly.

The clicker assembly comprises a movable yoke 40 which is formed with a central bore 41 adapted to fit over the reduced end portion 32 of the rod 31 and to rest firmly against the shoulder 33 and with an annular ridge 42 of a diameter less than the peripheral diameter of the yoke 40, thereby defining an annular groove 43. A dish-shaped clicker ring 44 is formed with a central aperture 45 which is adapted to receive the annular ridge 42, and with a radially extending valve operating arm 45.

The circumferential edge of the dish-shaped portion 44 is in contact with a spider 47, which restrains lateral movement of the clicker ring. The assembly is also provided with a base member 50 which is formed with a central axial bore 51 adapted to receive the reduced end portion 32 of the rod 31 and act as a guide therefor and with a circumferential ridge 52 having a diameter larger than the circumferential ridge 42. The base member 50 is supported against lateral movement by an adjustable base which comprises a threaded stud 53 which is disposed through a threaded bore 54 of a plug 55 in the base of the housing 10, and is provided with a cap 56 having an indicator 57 for adjustment purposes.

It will readily be seen that upon an increase in temperature the rubber-like substance 20 tends to expand and is forced into a lateral linear movement which displaces the piston 21 and the rod 31, thereby causing a displacement of the yoke 40 laterally against the base member 50. The circumferential ridges 42 and 52 tend to act as fulcrum points causing the spider 47 to assume a concave configuration and move in the direction of the clicker ring 44. The outer end of the spider 47 and the annular groove 43 act as fulcrum points tending to compress and reverse the concavity of the clicker assembly. In view of this distorted shape, it will not readily assume a flat position, and upon passing dead center will move with a snap action in the opposite direction, thereby causing the arm 45 to move in a clockwise direction in Figure 1 and release the pressure on the valve 14.

The valve 14 comprises a valve stem 60 which is controlled by the control arm 45, a valve face 61 and valve seat 62. Upon release of the pressure from the control arm 45, a spring 63 urges the valve 14 to the right thereby seating the valve 61 against the valve seat 62 and closing the gas passage.

It is clear that the temperature at which the clicker assembly will actuate the valve 14 will depend upon the setting of the knob 54 which controls the position of the base member 50.

Whereas, I have herein described my invention in connection with a substantially standard gas control valve, it is to be understood that the invention in its broadest aspects is applicable to any type of thermal control which is operable by a linear movement. The principle of the invention lies in that fact that I have provided a thermally responsive means which in all respects behaves like a liquid in that the volumetric expansion is translated into a linear movement, and yet which behaves like a solid in that it will not escape from the container even with substantially large openings therein.

I have described the actuating member 20 as being a rubber-like substance for want of a better term. By such description and by the term "rubber-like substance" in the appended claim, it is to be understood that I mean to include not only natural rubber but also the so-called synthetic rubbers of neoprene, hycar, butyls, silicones and other synthetic rubber-like plastics or any other material having a relatively high coefficient of expansion which readily flows in one direction and behaves in this respect like a liquid.

A further advantage in the use of such rubber-like substances lies in the relative coefficient of expansion. In a cast brass and Invar rod combination, the coefficients of expansion are as follows:

Cast brass _____ $18.75 \times 10^{-6}$
Invar _____ $.90 \times 10^{-6}$
Differential _____ $17.85 \times 10^{-6}$ Whereas in a cast brass-antimony rubber combination, the coefficients of expansion are as follows:

Cast brass _____ $18.75 \times 10^{-6}$
Red antimony rubber_____ $111.00 \times 10^{-6}$
Differential _____ $92.25 \times 10^{-6}$ The coefficient of expansion is expressed in terms of increase in length per unit length per degree centigrade. It readily becomes apparent that for a given length and temperature differential, the antimony rubber results in a linear movement of approximately 6.15 times that of the cast brass-invar combination; and when it is realized that all of the volumetric expansion of the antimony rubber is converted into linear movement by the restraining influence of the housing, it becomes apparent that the linear displacement due to a temperature differential becomes substantially larger than the differential of $92.25 \times 10^{-6}$.

While I have herein shown and described my invention in what I have conceived to be the most practical and preferred embodiment, it is recognized that departures may be made therefrom within the scope of my invention, which is not to be limited to the details disclosed herein, but is to be accorded the full scope of the claim so as to embrace any and all equivalent devices.

Having described my invention, what I claim as new and desire to secure by Letters Patent is:

A thermally responsive actuator comprising a casing having an elongated bore therein, an actuating rod extending axially within said bore at one end thereof, an annular guide secured to the wall of said bore and slidably supporting said rod, a body of rubber-like substance confined in the other end of said bore and spaced from said rod, said rubber-like substance having a coefficient of thermal expansion higher than that of said casing, a piston interposed between said rod and said rubber-like substance for transmitting linear expansion of the latter to said rod for slidable movement thereof, and yieldable means operative between said guide and said piston for biasing the latter toward said rubber-like substance and preloading the same, said other end of said bore being reduced in diameter and said piston being provided with a reduced portion for slidable movement therein for confining said rubber-like substance in said other end of said bore.

DAN A. BROWN.

REFERENCES CITED

The following references are of record in the file of this patent:

UNITED STATES PATENTS

| Number | Name | Date |
|---|---|---|
| 1,117,790 | Chapman | Nov. 17, 1914 |
| 1,326,237 | Walker | Dec. 30, 1919 |
| 1,988,345 | Vaughn | Jan. 15, 1935 |
| 2,238,837 | Vaughn et al. | Apr. 15, 1941 |

FOREIGN PATENTS

| Number | Country | Date |
|---|---|---|
| 471,960 | Great Britain | Sept. 14, 1937 |
| 741,706 | France | Dec. 13, 1932 |